(12) United States Patent
Courtier et al.

(10) Patent No.: US 11,131,197 B2
(45) Date of Patent: Sep. 28, 2021

(54) BLADE COMPRISING A STRUCTURE MADE OF COMPOSITE MATERIAL AND METHOD FOR MANUFACTURING THE SAME

(71) Applicant: Safran Aircraft Engines, Paris (FR)

(72) Inventors: Vivien Mickael Courtier, Moissy-Cramayel (FR); Anthony Binder, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 173 days.

(21) Appl. No.: 16/389,525

(22) Filed: Apr. 19, 2019

(65) Prior Publication Data
US 2019/0323357 A1  Oct. 24, 2019

(30) Foreign Application Priority Data

Apr. 20, 2018  (FR) .................................... 18 53509

(51) Int. Cl.
| | |
|---|---|
| *F01D 5/14* | (2006.01) |
| *B64C 11/06* | (2006.01) |
| *B64C 11/26* | (2006.01) |
| *B64C 11/30* | (2006.01) |
| *B64D 27/10* | (2006.01) |

(52) U.S. Cl.
CPC .............. *F01D 5/147* (2013.01); *B64C 11/06* (2013.01); *B64C 11/26* (2013.01); *B64C 11/30* (2013.01); *B64D 27/10* (2013.01); *F05D 2220/32* (2013.01); *F05D 2230/20* (2013.01); *F05D 2240/30* (2013.01)

(58) Field of Classification Search
CPC ......... B64C 11/06; B64C 11/26; F01D 5/282; F01D 5/3023
See application file for complete search history.

(56) References Cited

U.S. PATENT DOCUMENTS

| | | | |
|---|---|---|---|
| 2,967,043 A | * | 1/1961 | Dennis .................... F01D 5/147 416/221 |
| 3,752,600 A | | 8/1973 | Walsh et al. |

(Continued)

OTHER PUBLICATIONS

French Preliminary Search Report dated Dec. 12, 2018 in Patent Application No. FR 1853509 (with English translation of categories of cited documents), 3 pages.

*Primary Examiner* — Woody A Lee, Jr.
(74) *Attorney, Agent, or Firm* — Oblon, McClelland, Maier & Neustadt, L.L.P.

(57) ABSTRACT

A blade is provided including a structure made of composite material including a fibrous reinforcement obtained by three-dimensional weaving and a matrix in which the fibrous reinforcement is embedded, the structure made of composite material including an aerodynamically profiled blade portion and a blade root portion, the blade root portion including two sections each connected to the blade portion, a blade root fastening part including a wall delimiting a cavity and an opening formed in the wall, the structure made of composite material extending through the opening so that the blade portion is located outside the fastening part and the blade root portion is located inside the cavity, and a blocking part disposed in the cavity, between the two sections of the blade root portion, in order to keep the two sections apart from each other so as to oppose withdrawal of the blade root portion from the cavity via the opening.

16 Claims, 11 Drawing Sheets

(56) References Cited

U.S. PATENT DOCUMENTS

Figure 1:
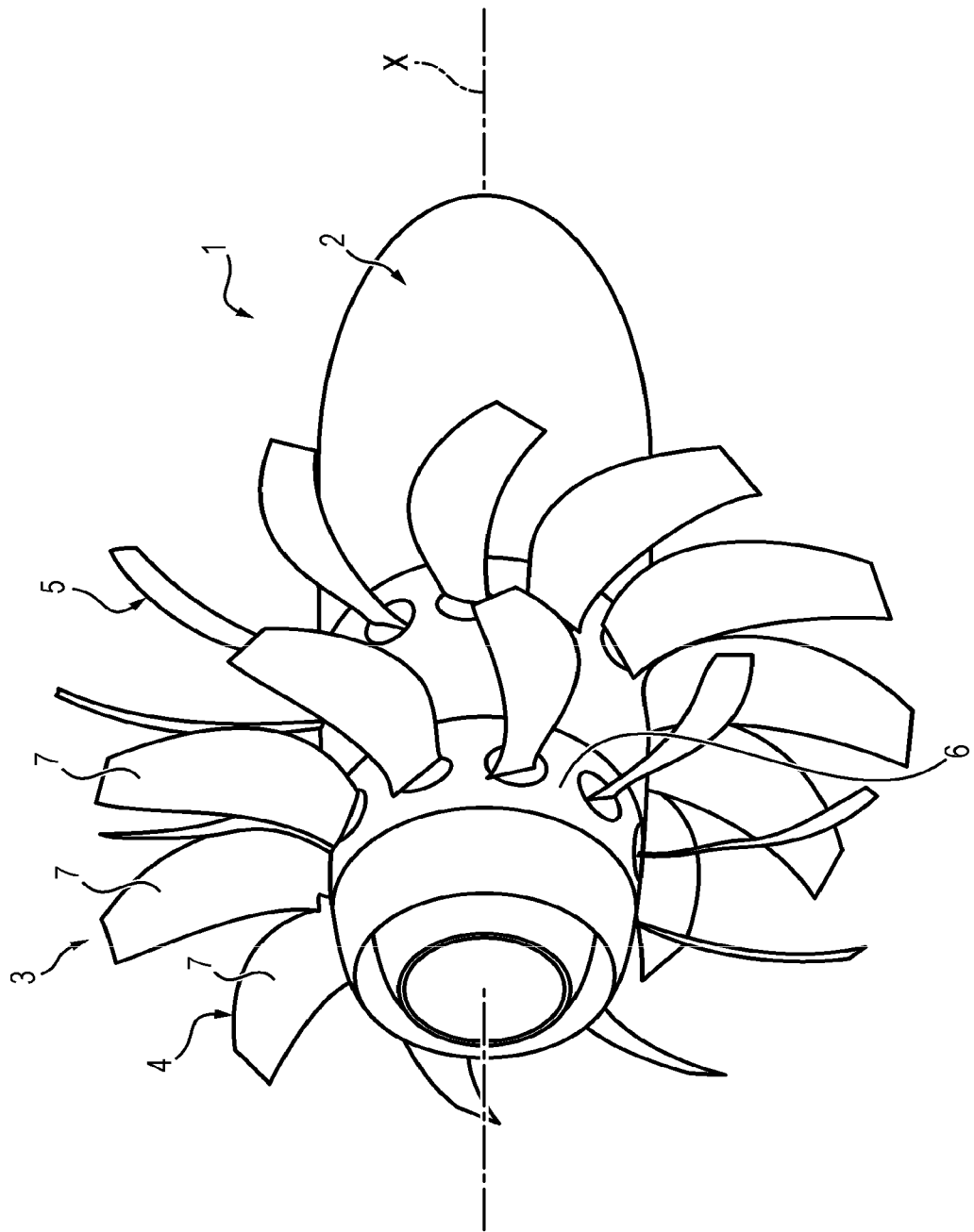

| | | | | |
|---|---|---|---|---|
| 4,045,149 | A | * | 8/1977 | Ravenhall ................. F01D 5/26 416/135 |
| 4,343,593 | A | * | 8/1982 | Harris ..................... F01D 5/282 416/193 A |
| 5,672,417 | A | | 9/1997 | Champenois et al. |
| 6,312,224 | B1 | * | 11/2001 | Knott ...................... F01D 5/143 416/230 |
| 10,590,780 | B2 | * | 3/2020 | McCaffrey ............ F01D 5/3084 |
| 10,941,665 | B2 | * | 3/2021 | Weaver ................... F01D 5/282 |
| 2005/0016842 | A1 | | 1/2005 | Schreiber |
| 2005/0084379 | A1 | | 4/2005 | Schreiber |

* cited by examiner

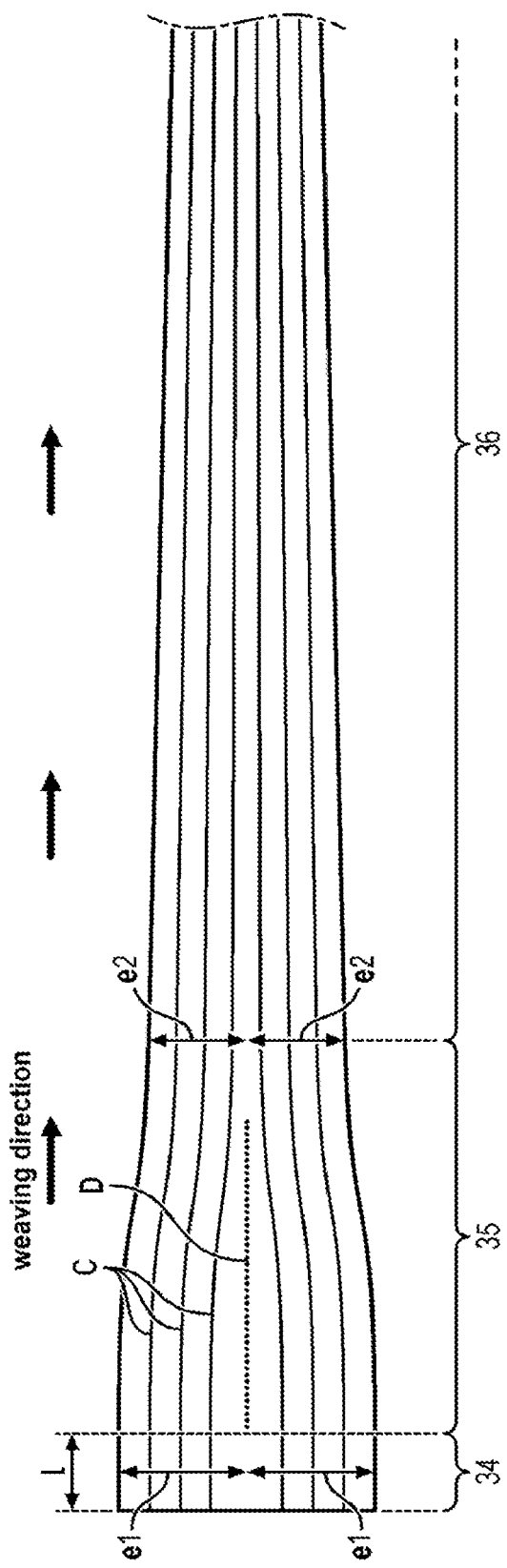

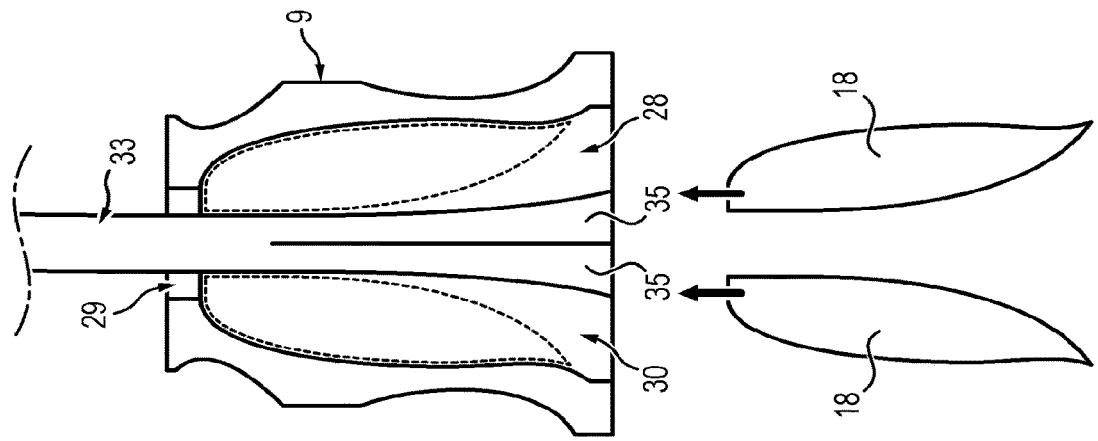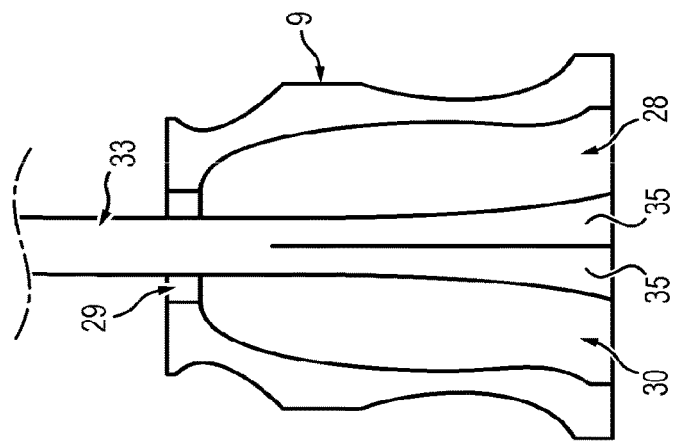

BLADE COMPRISING A STRUCTURE MADE OF COMPOSITE MATERIAL AND METHOD FOR MANUFACTURING THE SAME

TECHNICAL FIELD

The invention relates to a blade comprising a structure made of composite material.

The invention relates more particularly, but not exclusively, to a blade intended to be used in an unducted fan rotor of an aircraft engine (such as an "Open Rotor" type engine having two rotating propellers or an USF "Unducted Single Fan" type engine having a movable blading and a fixed blading or a turboprop having an architecture with a single propeller) or in a wind turbine rotor.

STATE OF THE ART

The advantage of unducted fan engines is that the diameter of the fan is not limited by the presence of a fairing, so that it is possible to design an engine having a high by-pass ratio, and consequently reduced fuel consumption.

Thus, in this type of engine, the blades of the fan can have a large span.

In addition, these engines generally comprise a mechanism for changing the setting angle of the blades in order to adapt the thrust generated by the fan based on the different flight phases.

However, the design of such blades requires taking into account opposing constraints.

On the one hand, the dimensioning of these blades must allow optimal aerodynamic performance (maximizing efficiency and providing thrust while minimizing losses). The improvement in the aerodynamic performance of the fan tends towards an increase in the by-pass ratio (BPR), which results in an increase in the outer diameter, and therefore the span of these blades.

On the other hand, it is also necessary to guarantee a resistance to the mechanical stresses that may be exerted on these blades while limiting their acoustic signature.

Furthermore, on the unducted fan architectures, the engine is usually started with a very open setting. Indeed, a very open setting allows consuming power by the torque, which ensures the machine safety while guaranteeing low fan speeds.

However, with a very open setting, the blades undergo a completely detached turbulent aerodynamic flow which generates a broadband vibratory excitation. Especially on wide-chord and large span blades, the bending force is intense, although the engine speed is not maximum.

In normal operation, during the ground and flight phases, the setting is changed (the setting angle is more closed). The aerodynamic flow is therefore perfectly clean (bonded back to the aerodynamic profile). The broadband loads disappear, the rotational speed is higher, and the bending force is mastered.

Currently, these blades are generally made of metal material. Although the blades made of metal material have good mechanical strength, they however have the disadvantage of having a relatively significant mass.

In order to reduce this mass, it is desirable to be able to manufacture these blades made of composite material. However, the intense aerodynamic forces to which these blades would be subjected could damage the blade and/or the hub in the interface area between these blades and the hub of the fan rotor. This problem arises more particularly when the blades are connected to the hub by means of pinned fasteners.

SUMMARY OF THE INVENTION

An object of the invention is to provide a blade including a composite material, adapted to be used with a variable angle setting mechanism, while being able to withstand intense aerodynamic forces.

This object is achieved within the context of the present invention by means of a blade comprising:
- a structure made of composite material comprising a fibrous reinforcement obtained by three-dimensional weaving and a matrix in which the fibrous reinforcement is embedded, the structure made of composite material comprising an aerodynamically profiled blade portion and a blade root portion, the blade root portion comprising two sections each connected to the profiled blade portion,
- a blade root fastening part comprising a wall delimiting a cavity and an opening formed in the wall, the structure made of composite material extending through the opening so that the profiled blade portion is located outside the fastening part and the blade root portion is located inside the cavity, and
- a blocking part disposed in the cavity, between the two sections of the blade root portion, in order to keep the two sections apart from each other so as to oppose a withdrawal of the blade root portion from the cavity via the opening.

The proposed assembly prevents the blade root portion from being removed from the fastening part and provides a blade root fastener rigid enough to withstand the broadband vibratory loads caused by a fully detached aerodynamic flow.

The proposed blade may furthermore have the following characteristics:
- the fibrous reinforcement comprises a section of fibrous blade reinforcement extending inside the aerodynamically profiled blade portion, and two sections of fibrous blade root reinforcement extending respectively inside the two blade root sections, and the sections of fibrous blade root reinforcement are woven continuously with the section of fibrous blade reinforcement,
- the two sections of fibrous blade root reinforcement are separated by a non-interlinked zone obtained during the three-dimensional weaving of the fibrous reinforcement,
- the blade comprises adapting parts disposed in the cavity, on either side of the blade root portion so that each section of the blade root portion is sandwiched between the blocking part and one of the two adapting parts,
- the blade comprises a cover designed to be attached to the fastening part in order to hold the blocking part in abutment against the two sections of the blade root portion,
- the blade comprises a seal disposed between the structure made of composite material and an edge of the opening of the fastening part,
- each section of the blade root portion has an increasing thickness when passing through the section while moving away from the blade portion,
- the fastening part has an outer surface of revolution, the outer surface having two circular grooves designed to form raceways for balls;
- the fastening part is made of metal.

The invention also relates to a method for manufacturing a blade from a fibrous reinforcement obtained by three-dimensional weaving and a blade root fastening part, the fibrous reinforcement comprising a section of fibrous blade reinforcement and two sections of fibrous blade root reinforcement, and the blade root fastening part comprising a wall delimiting a cavity and an opening formed in the wall, the method comprising steps of:

inserting the sections of fibrous blade root reinforcement into the cavity of the blade root fastening part via the opening of the fastening part, the section of fibrous blade reinforcement extending outside the fastening part, inserting a temporary filling part into the cavity of the fastening part, between the two sections of fibrous blade root reinforcement, in order to keep the two sections apart from each other, placing the fibrous reinforcement, the fastening part and the temporary filling part in a mold, injecting a plastic material into the mold so as to form a structure made of composite material comprising the fibrous reinforcement and a matrix in which the fibrous reinforcement is embedded, the structure made of composite material comprising an aerodynamically profiled blade portion and a blade root portion, the blade root portion extending inside the cavity of the blade root fastening part and comprising two sections each connected to the blade portion, removing the temporary filling part and inserting a blocking part between the two sections of the blade root portion, in order to keep the two sections apart from each other so as to oppose a removal of the blade root portion from the cavity via the opening.

The method may further comprise a prior step of:

weaving the three-dimensional fibrous reinforcement, with warp strands extending both in the section of fibrous blade reinforcement and in one of the two sections of fibrous blade root reinforcement.

The step of weaving the fibrous reinforcement may comprise successively the weaving of a temporary section of fibrous reinforcement, the weaving of the two sections of fibrous blade root reinforcement, the two sections of fibrous blade root reinforcement being separated by a non-interlinked zone, and then the weaving of the section of fibrous blade reinforcement, the method further comprising a step of cutting the temporary section of fibrous reinforcement.

The fibrous reinforcement may be woven so that each section of fibrous blade root reinforcement has a decreasing thickness when passing through the section while moving closer to the blade portion.

Each section of blade root reinforcement may be obtained by weaving with successive weft strands, the weft strands having different titrations that decrease when passing through the section while moving closer to the blade portion.

The method may further comprise a step of inserting adapting parts into the cavity, on either side of the blade root portion, so that each section of the blade root portion extends between the temporary filling part and one of the adapting parts, prior to the plastic material injection step.

The method may further comprise a step of heating the plastic material so as to cause polymerization of the plastic material, for example by cross-linking.

The method may further comprise steps of:

inserting a temporary filling part between the fibrous reinforcement and an edge of the opening of the fastening part, prior to the plastic material injection step, removing the temporary filling part, after the plastic material injection step, and mounting a seal between the structure made of composite material and an edge of the opening of the fastening part.

The method may further comprise a step of attaching a cover to the fastening part in order to hold the blocking part in abutment against the two sections of the blade root portion.

The invention also relates to a gas turbine engine comprising a fan, the fan comprising a hub and blades extending radially from the hub, the blades being as described previously.

In such a gas turbine engine, each blade may be rotatably mounted relative to the hub about a respective setting axis, the engine further comprising an actuating mechanism designed to be controlled to rotate the blades about their setting axes so as to change the setting angle of the blades.

PRESENTATION OF THE DRAWINGS

Figure 2:
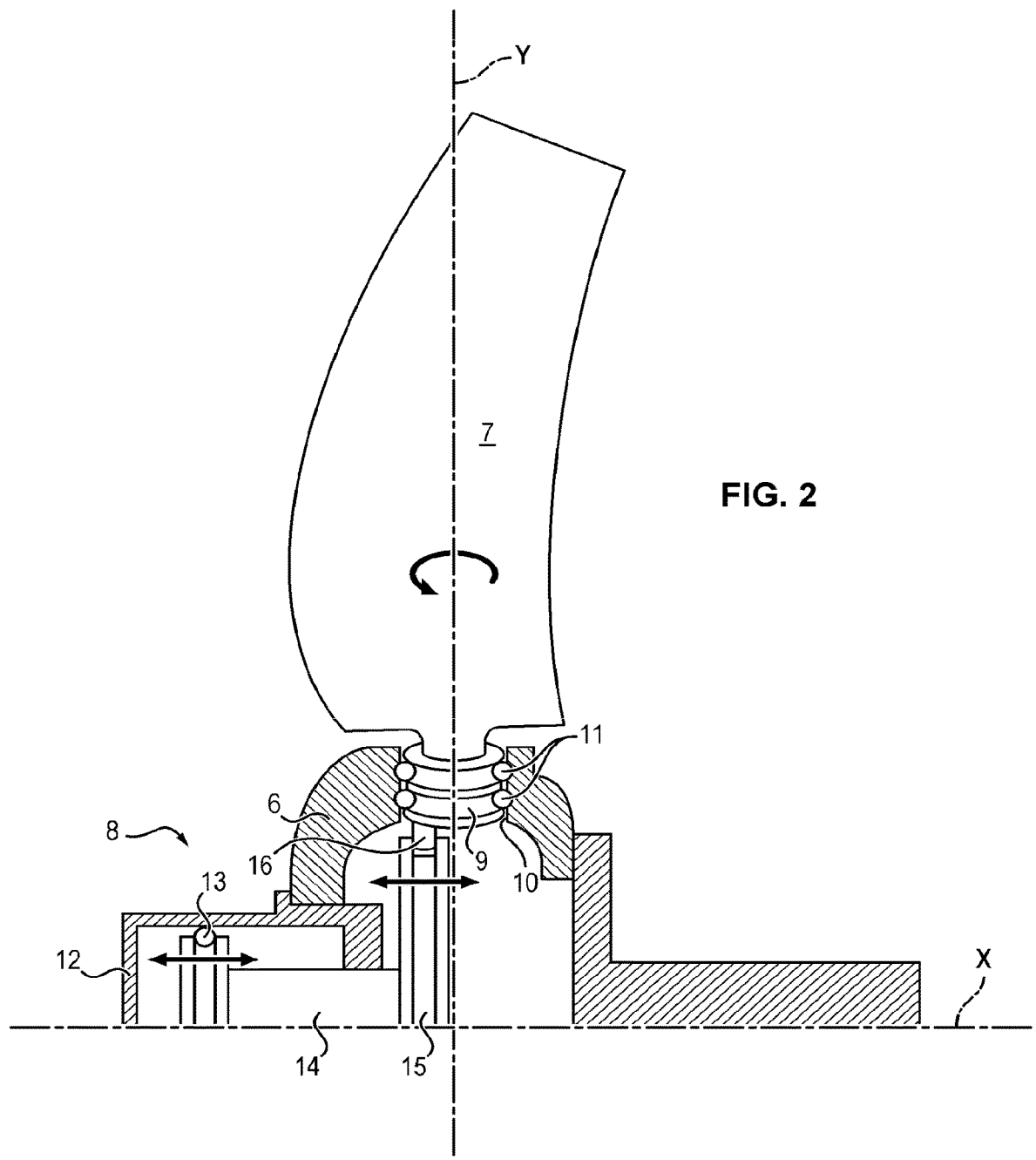
Figure 3:
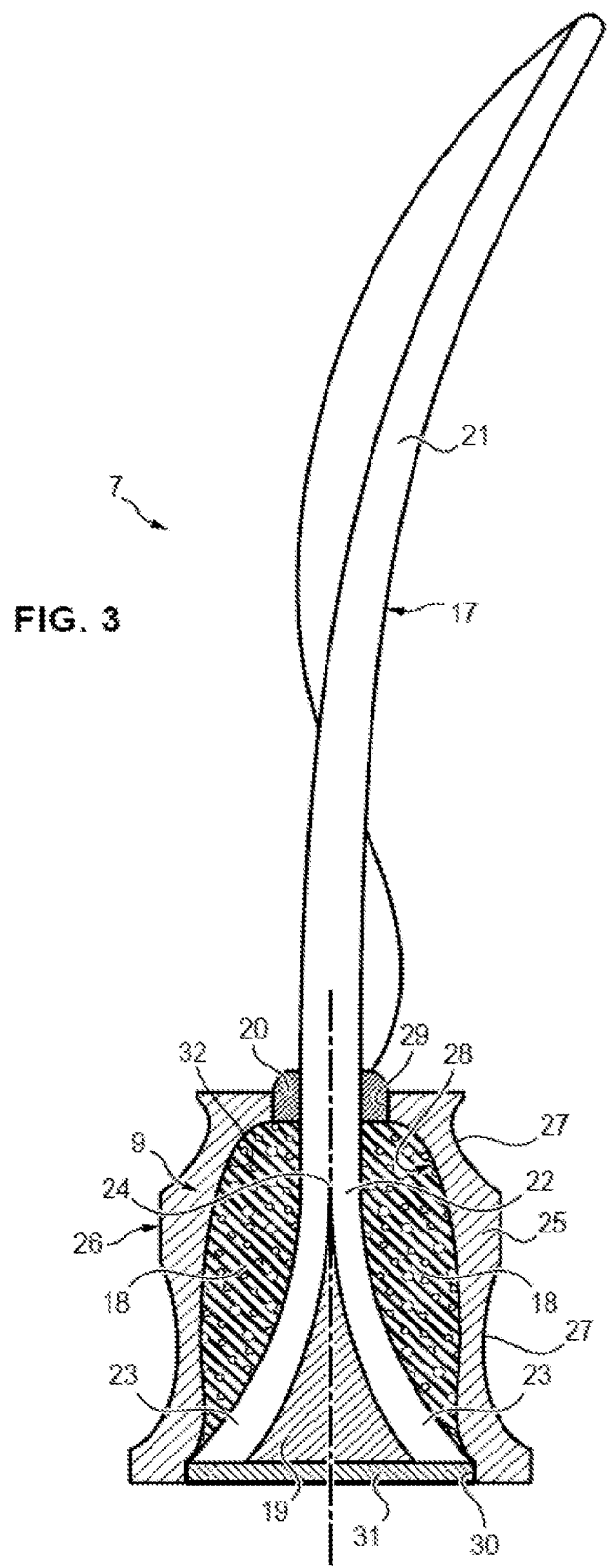
Figure 4:
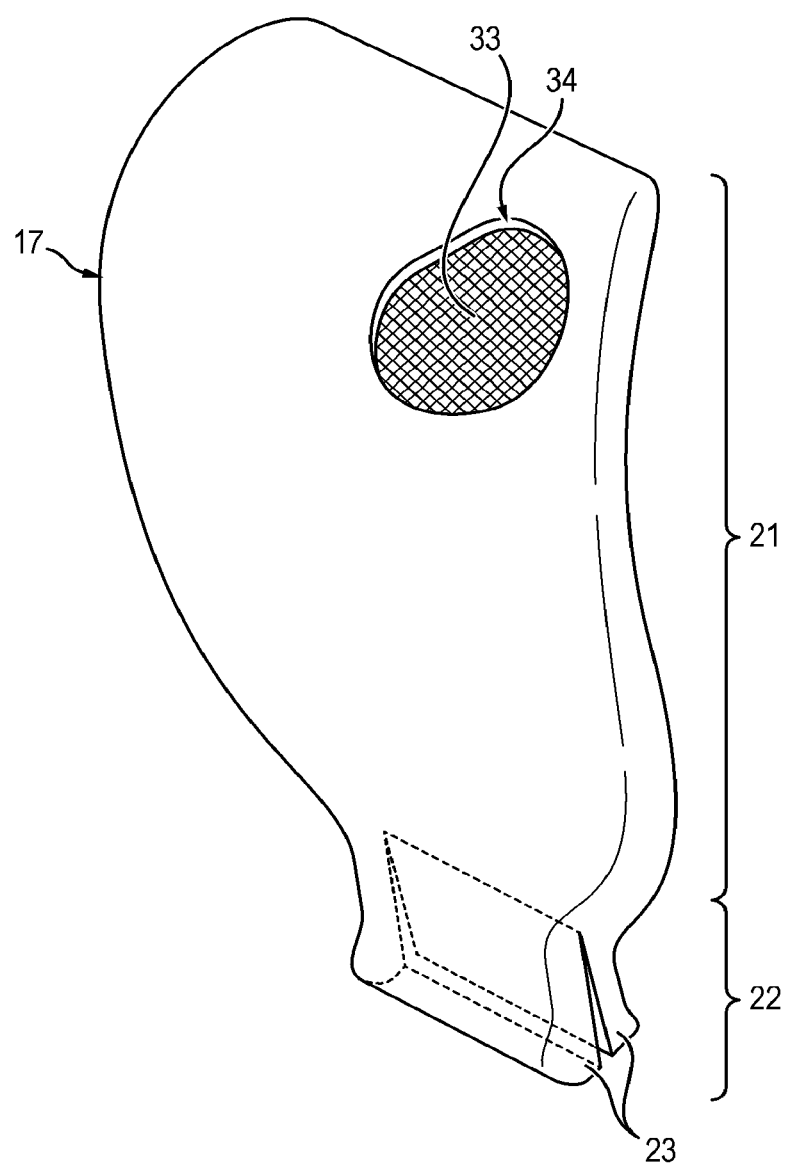
Figure 5:
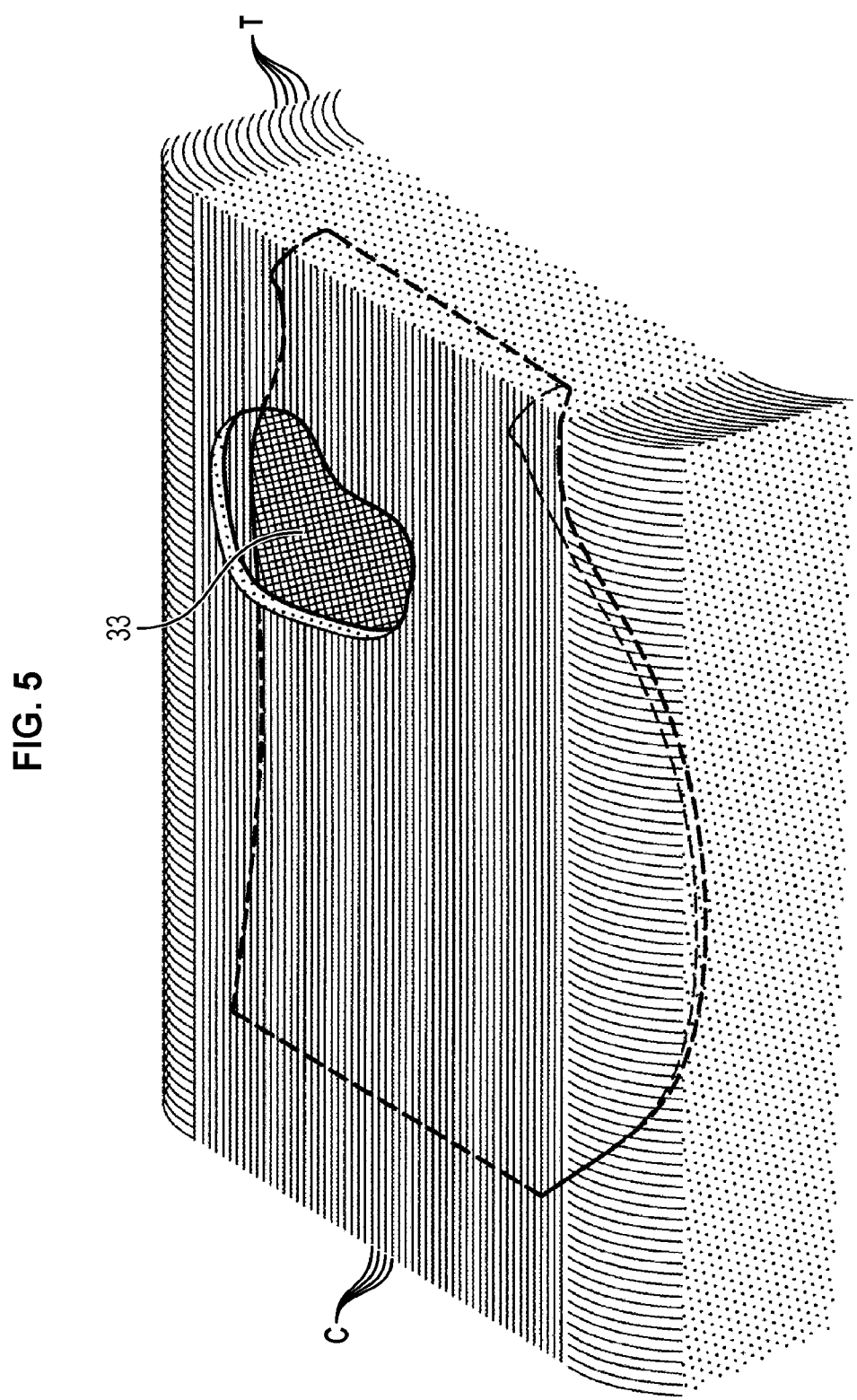

Other characteristics and advantages will become apparent from the following description, which is purely illustrative and non-restrictive and should be read in relation to the appended figures, among which:

FIG. 1 schematically represents an example of an engine including an unducted fan, FIG. 2 schematically represents a fan blade and an actuating mechanism making it possible to modify the setting angle of the blades of the fan, FIG. 3 schematically represents a fan blade according to one embodiment of the invention, FIG. 4 schematically represents a structure made of composite material forming part of the blade, FIGS. 5 to 16 schematically illustrate steps of a method for manufacturing a blade according to one embodiment of the invention.

DETAILED DESCRIPTION OF AN EMBODIMENT

In FIG. 1, the engine 1 represented is an "Open Rotor" type engine, in a configuration commonly referred to as "pusher" (i.e. the fan is placed at the rear of the power generator with an air inlet located on the side, to the right of FIG. 1).

The engine comprises a nacelle 2 intended to be attached to a fuselage of an aircraft, and an unducted fan 3. The fan 3 comprises two counter-rotating fan rotors 4 and 5. In other words, when the engine 1 is in operation, the rotors 4 and 5 are rotatably driven with respect to the nacelle 2 about the same axis of rotation X (which is coincident with a main axis of the engine), in opposite directions.

In the example illustrated in FIG. 1, the engine 1 is an "Open Rotor" type engine, in "pusher" configuration, with counter-rotating fan rotors. However, the invention is not limited to this configuration. The invention also applies to "Open Rotor" type engines, in "puller" configuration (i.e. the fan is placed upstream of the power generator with an air inlet located prior to, between or just behind the two fan rotors).

In addition, the invention also applies to engines having different architectures, such as an architecture comprising a fan rotor comprising movable blades and a fan stator comprising fixed blades, or a single fan rotor.

The invention is applicable to turboprop-type architectures (comprising a single fan rotor).

In FIG. 1, each fan rotor 4, 5 comprises a hub 6 rotatably mounted relative to the nacelle 2 and a plurality of blades 7 attached to the hub 6. The blades extend substantially radially with respect to the axis of rotation X of the hub.

As illustrated in FIG. 2, the fan 3 further comprises an actuating mechanism 8 for collectively modifying the setting angle of the blades of the rotors, in order to adapt the performance of the engine to the different flight phases. For this purpose, each blade 7 comprises a fastening part 9 disposed at the blade root. The fastening part 9 is rotatably mounted relative to the hub 6 about a setting axis Y. More precisely, the fastening part 9 is rotatably mounted inside a housing 10 formed in the hub 6, by means of balls 11 or other rolling elements.

The actuating mechanism 8 comprises an actuator 12 comprising a body 13 attached to the hub 6 and a rod 14 designed to be driven in translation relative to the body 12. The actuating mechanism 8 further comprises an annular slide 15 mounted secured to the rod 14 and a pin 16 mounted secured to the fastening part 9. The pin 16 is designed to slide in the slide 15 and to rotate relative to the slide 15, so as to convert a translational movement of the rod 14 into a rotational movement of the fastening part 9, and consequently a rotational movement of the blade 7 with respect to the hub 6 about its setting axis Y.

FIG. 3 represents in more detail, in longitudinal section, the fan blade 7. In this figure, the represented blade 7 comprises a structure made of composite material 17, a blade root fastening part 9, two adapting parts 18, a blocking part 19 and a seal 20.

The structure made of composite material 17 comprises an aerodynamically profiled blade portion 21 and a blade root portion 22. The aerodynamically profiled blade portion 21 is designed to be placed in an air flow, when the engine is in operation, in order to generate lift. The blade root portion 22 is intended to attach the structure made of composite material 17 to the blade root fastening part 9.

The blade root portion 22 comprises two sections 23 continuously connected to the blade portion 21 at a junction area 24. Each section 23 has a thickness which increases when passing through the section 23 while moving away from the aerodynamically profiled blade portion 21.

The blade root fastening part 9 is made of metal, for example of martensitic steel. The fastening part 9 comprises a wall 25 having an inner surface 32 and an outer surface 26. with the outer surface 26 has a shape of revolution, having an axis of revolution (which is the setting axis Y when the blade 7 is mounted in the actuating mechanism). The outer surface 26 has two circular grooves 27 designed to form raceways for balls or other rolling elements.

The wall 25 of the fastening part 9 delimits a cavity 28 designed to house the blade root portion 22 of the structure made of composite material 17. The wall 25 has a generally rectangular first opening 29 through which the structure made of composite material extends so that the blade portion 21 is located outside the fastening part 9. The fastening part 9 further has a generally circular second opening 30, wider than the first opening 29, and located under the blade root portion 22, on an opposite side of the fastening part 9 with respect to the first opening 28.

The two adapting parts 18 and the blocking part 19 are also disposed inside the cavity 28.

The adapting parts 18 are positioned on either side of the blade root portion 22. The adapting parts 18 are positioned in contact with the inner surface 32 of the wall 35. The blocking part 19 is disposed between the two sections 23 of the blade root portion 22, so that each of the two sections 23 is sandwiched between one of the adapting parts 18 and the blocking part 19.

The blocking part 19 has a wedge shape. The blocking part 19 allows keeping the two sections 23 of the blade root portion 22 apart from each other so as to oppose a withdrawal of the blade root portion 22 from the cavity 28 via the opening 29. The blocking part 19 can be formed of metal, for example aluminum, titanium, or of a composite material, such as an organic matrix composite material (CMO) which has the advantage of being light.

The fan blade 7 further comprises a cover 31 designed to be attached to the fastening part 9, for example by screwing. When the cover 31 is attached to the fastening part 9, it closes the second opening 30. In addition, the cover 31 exerts on the blocking part 19 a force which tends to press the blocking part 19 against the blade root sections 23, so that each of the two sections 23 is compressed between one of the adapting parts 18 and the blocking part 19. The cover 31 is preferably made of metal.

The seal 20 extends in the first opening 29, between the structure made of composite material 17 and the edge of the first opening 29 which surrounds the structure made of composite material 17. The seal 20 allows filling the gap remaining between the structure made of composite material 17 and the fastening part 9.

FIG. 4 schematically represents the structure made of composite material 17.

The composite material comprises a fibrous reinforcement 33 obtained by three-dimensional weaving and a matrix 34 in which the fibrous reinforcement 33 is embedded.

The fibrous reinforcement 33 is woven in such a way that it comprises warp yarns that extend continuously both inside the aerodynamically profiled blade portion 21 and inside the blade root portion 22.

The matrix 34 that coats the yarns of the fibrous reinforcement 33 is formed of plastic material.

FIGS. 5 to 16 illustrate steps of a method for manufacturing a fan blade 7 according to a possible embodiment of the invention.

According to a first step (FIG. 5), the fibrous reinforcement 33 is achieved by three-dimensional weaving on a jacquard-type loom. During weaving, warp yarn bundles C (or warp strands) are disposed in several layers of several hundred yarns each. Weft yarns T (or weft strands) are interlaced with the warp yarns C so as to bind the various layers of warp yarns C together.

In the example illustrated, the three-dimensional weaving is a weaving with an "interlock" pattern. By "interlock" is meant a weaving pattern in which each layer of weft yarns binds several layers of warp yarns with all the yarns of the same weft column having the same movement in the plane of the pattern.

Other types of known three-dimensional weavings may be used, such as those in particular described in document WO 2006/136755.

The fibrous reinforcement 33 is woven from carbon fiber yarns.

As illustrated in FIG. 6, the step of weaving the raw fibrous reinforcement 33 (or preform) comprises successively the weaving of a temporary section of fibrous reinforcement 34 (which will be dropped later during the manufacturing method), the weaving of the two sections of fibrous blade root reinforcement 35, and then the weaving of a section of fibrous blade reinforcement 36.

The temporary section of fibrous reinforcement 34 is woven by interleaving all the warp strands C necessary for the achievement of the fibrous reinforcement 33. Once the weft column has reached a predetermined width 1, a non-interlinked zone D is initiated between two successive layers of warp yarns C. Then, the two sections of fibrous blade root reinforcement 35 are woven in parallel with each other, while being separated by the non-interlinked zone D. Then, the non-interlinked zone D is stopped and the section of fibrous blade reinforcement 36 is woven.

In this way, each of the two sections of blade root reinforcement 35 comprises warp yarns C that extend inside the section of fibrous blade reinforcement 36.

Figure 7A:
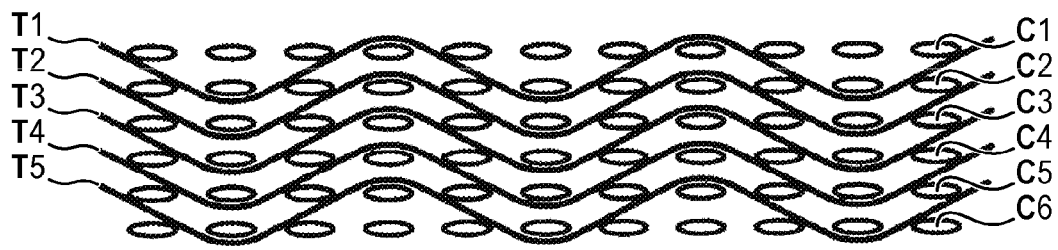

FIG. 7A is an enlarged schematic cross-sectional view of a plurality of layers of $C_1$-$C_6$ warp yarns, in a portion of the fibrous reinforcement that does not comprise a non-interlinked zone. In this example, the fibrous reinforcement comprises 6 layers of $C_1$-$C_6$ warp yarns extending in a direction transverse to the sectional plane. The layers of $C_1$-$C_6$ warp yarns are connected together by 5 layers of $T_1$-$T_5$ weft yarns extending in the sectional plane (or pattern plane).

Figure 7B:
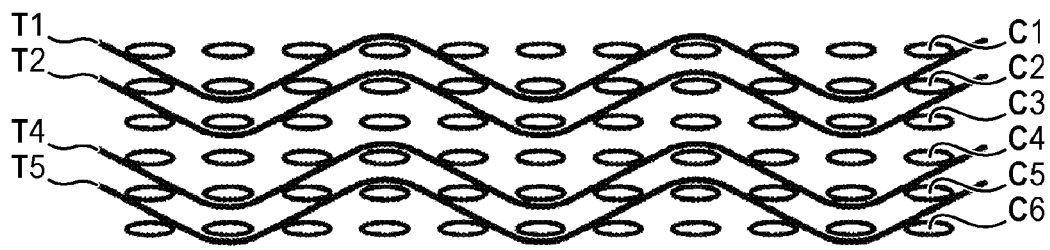
Figure 8:
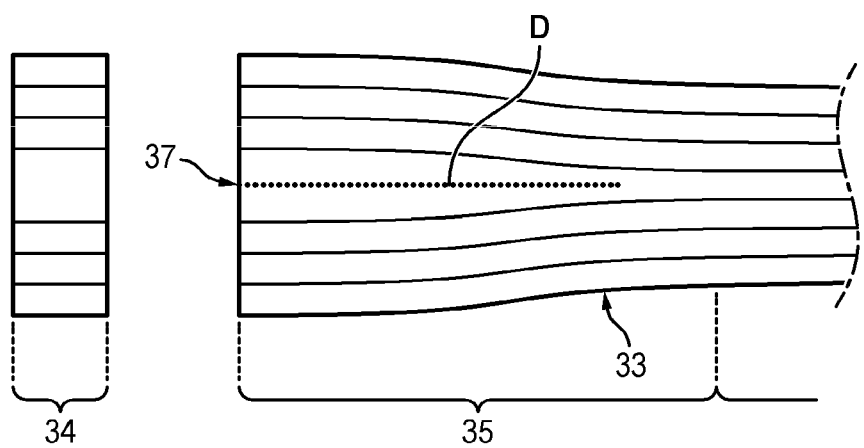
Figure 11:
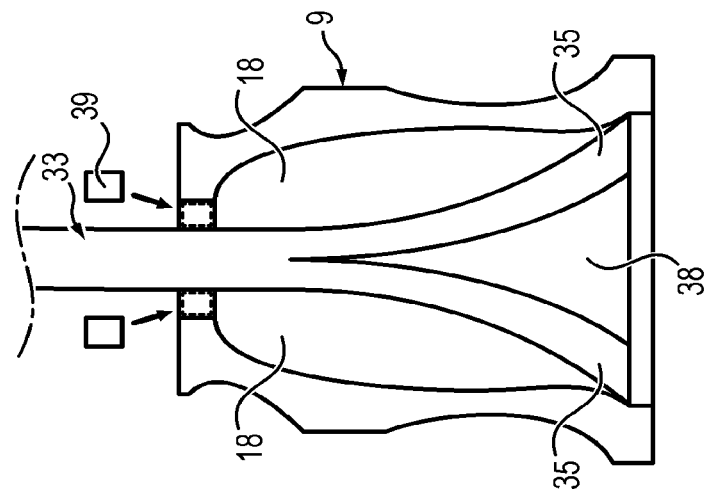
Figure 12:
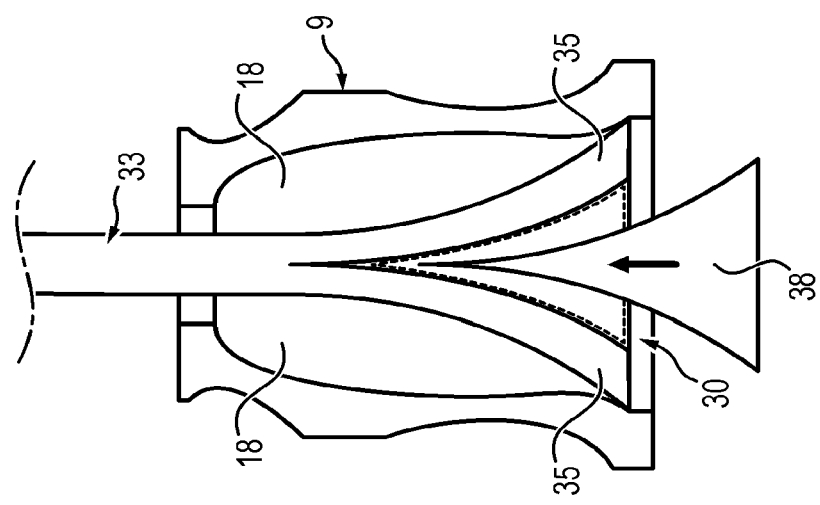
Figure 14:
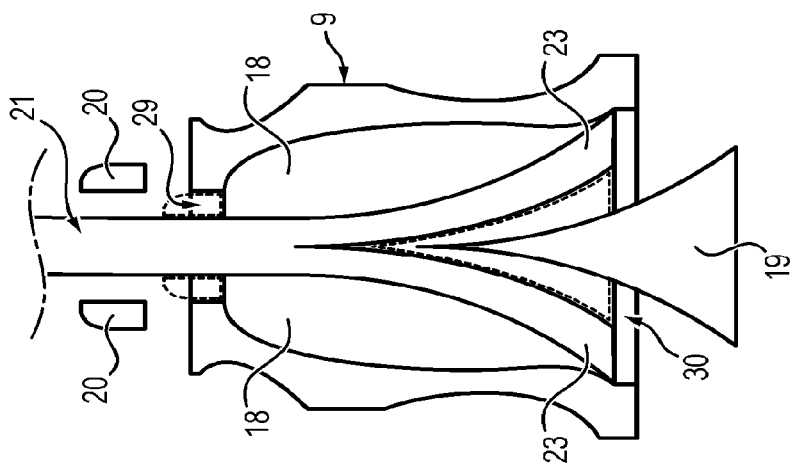
Figure 13:
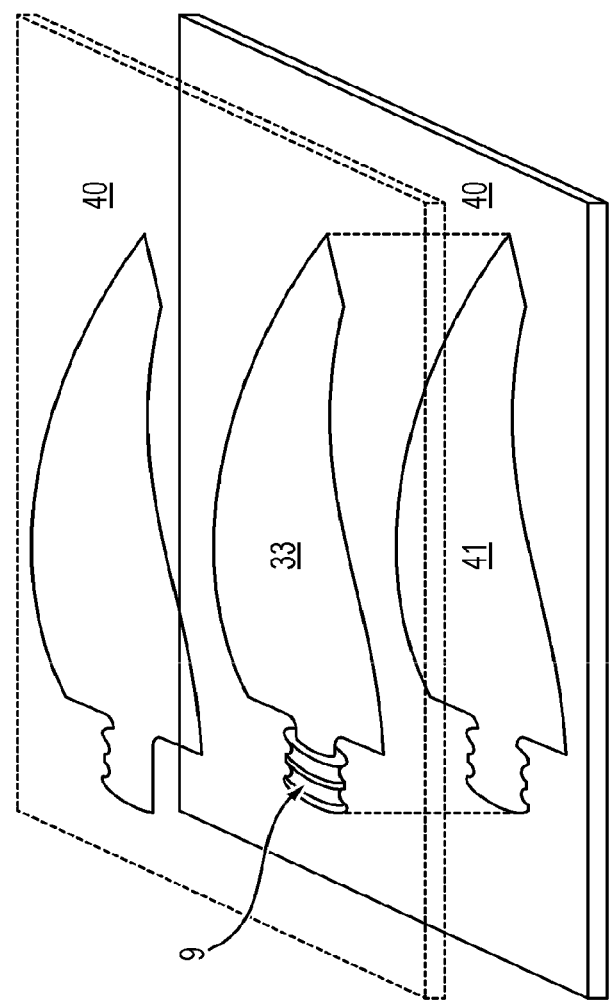
Figure 15:
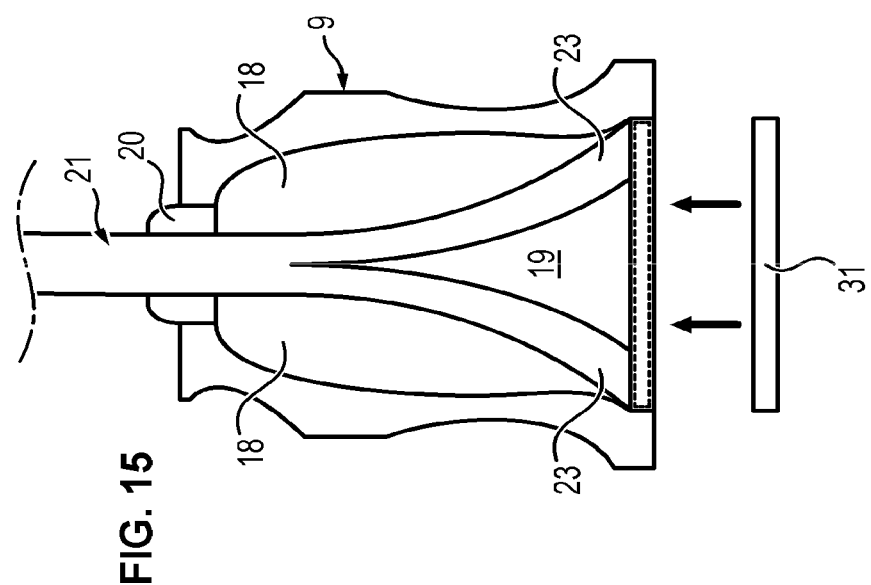
Figure 16:
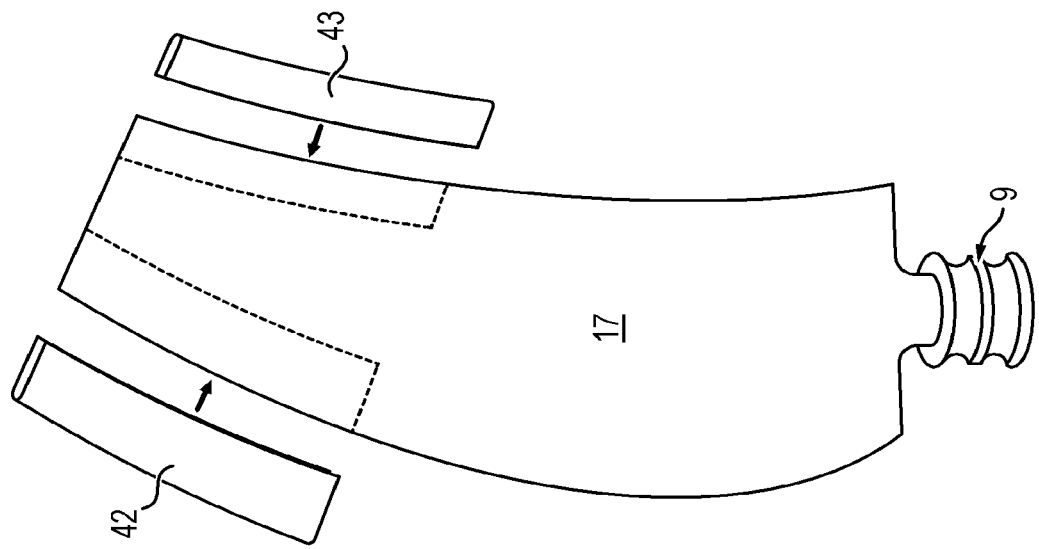

FIG. 7B is an enlarged schematic cross-sectional view of a plurality of layers of $C_1$-$C_6$ warp yarns in a portion of the fibrous reinforcement including a non-interlinked zone. The three layers of $C_1$-$C_3$ warp yarns are connected together by two layers of $T_1$ and $T_2$ weft yarns, while the three layers of $C_4$-$C_5$ warp yarns are connected together by two layers of $T_4$ and $T_5$ weft yarns. As seen in FIG. 7B, two layers of adjacent $C_3$ and $C_4$ warp yarns are not connected together by weft yarns, so that a non-interlinked zone is formed in the fibrous reinforcement.

Furthermore, as seen in FIG. 6, each section of fibrous blade root reinforcement 35 has been woven with successive weft strands T that have different titrations, that decrease in the weaving direction (weaving direction indicated by the arrow), that is to say titrations that decrease as moving closer to the section of fibrous blade reinforcement 36.

It is recalled that the "titration" designates a parameter characterizing the fineness of a yarn: it is defined as being the mass of the yarn per unit length. The standard unit for measuring the titration is the Tex (mass in grams of 1000 meters of yarn) or the Decitex (mass in grams of 10,000 meters of yarn). Other units can also be used such as the denier, the metric number or the English number.

In this way, the sections of fibrous blade root reinforcement 35 each have a thickness e that decreases while moving closer to the section of fibrous blade reinforcement 36. Each section of fibrous blade root reinforcement has a thickness $e_1$ at the blade root and a thickness $e_2$ at the junction with the section of fibrous blade reinforcement 36, less than $e_1$.

As weaving of the fibrous reinforcement 33 progresses, whose thickness and width vary, a certain number of warp yarns C are not woven, which makes it possible to define continuously variable desired contour, width and thickness of the fibrous reinforcement 33.

According to a second step (FIG. 8), the warp yarns C and the weft yarns T located at the limit of the woven mass (called "floats") are also cut, so as to extract the fibrous reinforcement 33.

Then, the finished fibrous reinforcement is obtained by performing a contouring of the preform. The contouring refers to the cutting of the flat preform along the leading edge, the trailing edge, the head (while leaving excess lengths on these three cutouts). A contouring is also performed along the lower path and on the side faces of the blade root portion, In addition, the temporary section of fibrous reinforcement 34 is cut in order to be eliminated, so that the non-interlinked zone D forms a through opening 37 between the two sections of blade root reinforcement 35. The contouring and the cutting of the blade root section can be performed by pressurized water jet.

According to a third step (FIG. 9), the sections of fibrous blade root reinforcement 35 are inserted into the cavity 28 of the blade root fastening part 9 via the first opening 29 of the fastening part 9. Once the sections of fibrous blade root reinforcement 35 are inserted into the cavity 28, the sections of fibrous blade root reinforcement 35 extend inside the cavity 28 of the fastening part 9 while the section of fibrous blade reinforcement 36 extends outside the fastening part 9.

According to a fourth step (FIG. 10), the adapting parts 18 are inserted into the cavity 28, on either side of the section of blade root reinforcement 35, via the second opening 30. The adapting parts 18 may be parts made of an expanded plastic material. The material forming the adapting parts has preferably closed cells so as to prevent plastic material penetration which will be injected during the subsequent molding step, and thus preserve its low density.

According to a fifth step (FIG. 11), a first wedge-shaped temporary filling part 38 is inserted into the cavity 28 of the fastening part 9, between the two sections of fibrous blade root reinforcement 35, in the non-interlinked zone, in order to keep the two sections apart from each other. Thus, each section of fibrous blade root reinforcement 35 extends between the temporary filling part 38 and one of the two adapting parts 18.

According to a sixth step (FIG. 12), a second temporary filling part 39 is inserted in the first opening 29 of the fastening part 9. More precisely, the second temporary filling part 39 is inserted between the fibrous reinforcement 33 and the edge of the opening 29 of the fastening part 9.

According to a seventh step (FIG. 13), the assembly obtained, comprising the fibrous reinforcement 33, the fastening part 9, the adapting parts 18 and the filling parts 38 and 39, is placed in a mold 40. The mold 40 is a mold having a cavity 41 with the shape of the final molded part (namely the fan blade 7).

According to an eighth step, plastic material (called "resin") is injected into the mold 40 so as to impregnate all the fibrous reinforcement 33. The injection of plastic material can be performed by an injection technique called "Resin Transfer Molding" (RTM). The injected plastic material is, for example, a thermosetting liquid composition containing an organic precursor of the matrix material. The organic precursor is usually in the form of a polymer, such as a resin, optionally diluted in a solvent.

According to a ninth step, the plastic material is heated so as to cause a polymerization of the plastic material, for example by cross-linking. For this purpose, the mold 40 is placed in an oven.

According to a tenth step, the part obtained is demolded.

According to an eleventh step, the part is contoured by machining of the leading edge, the trailing edge and the blade head in order to obtain a part having the desired shape. The lower portion of the blade is also machined.

The reinforcement 33 impregnated with plastic material constituting the matrix 34 forms a structure made of composite material 17.

According to a twelfth step (FIG. 14), the first temporary filling part 38 and the second temporary filling part 39 are removed.

According to a thirteenth step, the blocking part 19 is inserted through the second opening 30, instead of the first temporary filling part 38, between the two sections of the blade root portion 23, in order to keep the two sections 23 apart from each other.

In addition, the seal 20 is inserted in the first opening 29, instead of the second temporary filling part 39.

According to a fourteenth step (FIG. 15), the cover 31 is attached to the fastening part 9 in order to hold the blocking part 19 in abutment against the two sections 23 of the blade root portion. In particular, the cover 31 is attached so that it exerts on the blocking part 19 a compressive force, tending to push the blocking part 19 between the two sections 23 of the blade root portion 22 towards the aerodynamically profiled blade portion 21. Once the cover 31 is attached to the fastening part 9, each section 23 of the blade root portion 22 is compressed between one of the two adapting parts 18 and the blocking part 19.

This mounting makes it possible to guarantee that the two sections 23 remain apart from each other in order to withstand geometrically the centrifugal forces exerted on the blade 7 during operation of the engine.

The method may further comprise the following additional steps:

According to a fifteenth step (FIG. 16), one or more reinforcing part(s) 42, 43 can be added onto the structure made of composite material 17. In particular, the reinforcing parts may comprise a leading edge reinforcing part 42 and/or a trailing edge reinforcing part 43.

The reinforcing part(s) 42, 43 may be formed of metal. They can be bonded onto the structure made of composite material 17.

According to a sixteenth step, the structure made of composite material 17 may be covered with a protective layer, for example a polyurethane protective layer, in order to protect the blade against abrasion and impacts of objects.

The invention claimed is:

1. A blade comprising:
   a structure made of composite material comprising a fibrous reinforcement obtained by three-dimensional weaving and a matrix in which the fibrous reinforcement is embedded, the structure made of composite material comprising an aerodynamically profiled blade portion and a blade root portion, the blade root portion comprising two sections each connected to the profiled blade portion;
   a blade root fastening part comprising a wall delimiting a cavity and an opening formed in the wall, the structure made of composite material extending through the opening so that the profiled blade portion and the blade root portion is located inside the cavity;
   a blocking part disposed in the cavity, between the two sections of the blade root portion, in order to keep the two sections apart from each other so as to oppose a withdrawal of the blade root portion from the cavity via the opening; and
   a cover designed to be attached to the fastening part in order to hold the blocking part in abutment against the two sections of the blade root portion.

2. The blade according to claim 1, wherein the fibrous reinforcement comprises a section of fibrous blade reinforcement extending inside the aerodynamically profiled blade portion, and two sections of fibrous blade root reinforcement extending respectively inside the two blade root sections, and wherein the sections of fibrous blade root reinforcement are each woven continuously with the section of fibrous blade reinforcement.

3. The blade according to claim 2, wherein the two sections of fibrous blade root reinforcement are separated by a non-interlinked zone obtained during the three-dimensional weaving of the fibrous reinforcement.

4. The blade according to claim 1, further comprising adapting parts disposed in the cavity, on either side of the blade root portion, so that each section of the blade root portion is sandwiched between the blocking part and one of the two adapting parts.

5. The blade according to claim 1, further comprising a seal disposed between the structure made of composite material and an edge of the opening of the fastening part.

6. The blade according to claim 1, wherein each section of the blade root portion has an increasing thickness when passing through the section while moving away from the blade portion.

7. The blade according to claim 1, wherein the fastening part is made of metal.

8. A gas turbine engine comprising a fan, the fan comprising a hub and a plurality of blades extending radially from the hub, each blade of the plurality of blades being in accordance with claim 1.

9. The gas turbine engine according to claim 8, wherein each blade is rotatably mounted relative to the hub about a respective setting axis, the engine further comprising an actuating mechanism designed to be controlled to rotate the blades about their setting axes so as to change the setting angle of the blades.

10. A method for manufacturing a blade according to claim 1, the method comprising steps of:
   inserting the sections of fibrous blade root reinforcement into the cavity of the blade root fastening part via the opening of the fastening part, the section of fibrous blade reinforcement extending outside the fastening part;
   inserting a temporary filling part into the cavity of the fastening part between the two sections of fibrous blade root reinforcement, in order to keep the two sections apart from each other;
   placing the fibrous reinforcement, the fastening part and the temporary filling part in a mold;
   injecting a plastic material into the mold so as to form the structure made of composite material comprising the fibrous reinforcement and the matrix in which the fibrous reinforcement is embedded;
   removing the temporary filling part and inserting the blocking part between the two sections of the blade root portion, in order to keep the two sections apart from each other so as to oppose withdrawal of the blade root portion from the cavity via the opening; and
   attaching the cover to the fastening part in order to hold the blocking part in abutment against the two sections of the blade root portion.

11. The method according to claim 10, further comprising a prior step of:
   weaving the three-dimensional fibrous reinforcement, with warp strands extending both in the section of fibrous blade reinforcement and in one of the two sections of fibrous blade root reinforcement.

12. The method according to claim 11, wherein the step of weaving the fibrous reinforcement comprises successively the weaving of a temporary section of fibrous reinforcement, the weaving of the two sections of fibrous blade root reinforcement, the two sections of fibrous blade root reinforcement being separated by a non-interlinked zone, and then the weaving of the section of fibrous blade reinforcement, the method further comprising a step of cutting the temporary section of fibrous reinforcement.

13. The method according claim 11, wherein the fibrous reinforcement is woven so that each section of fibrous blade root reinforcement has a decreasing thickness when passing through the section while moving closer to the blade portion.

14. The method according to claim 13, wherein each section of blade root reinforcement is obtained by weaving with successive weft strands, the weft strands having different titrations which decrease when passing through the section while moving closer to the blade portion.

15. The method according to claim 10, further comprising a step of inserting adapting parts into the cavity, on either side of the blade root portion, so that each section of the blade root portion extends between the temporary filling part and one of the adapting parts, prior to the plastic material injection step.

16. The method according to claim 10, further comprising steps of:
- inserting a temporary filling part between the fibrous reinforcement and an edge of the opening of the fastening part, prior to the plastic material injection step, and
- removing the temporary filling part, after the plastic material injection step, and mounting a seal between the structure made of composite material and an edge of the opening of the fastening part.

\* \* \* \* \*